United States Patent
Luo et al.

(10) Patent No.: US 11,569,494 B2
(45) Date of Patent: Jan. 31, 2023

(54) AQUEOUS CATHODE SLURRY

(71) Applicant: CPS TECHNOLOGY HOLDINGS LLC, New York, NY (US)

(72) Inventors: Qiang Luo, Milwaukee, WI (US); Junwei Jiang, Glendale, WI (US); Yongkyu Son, Glendale, WI (US); Bernhard M. Metz, Milwaukee, WI (US); Patrick T. Hurley, Mequon, WI (US)

(73) Assignee: CPS TECHNOLOGY HOLDINGS LLC, New York, NY (US)

(*) Notice: Subject to any disclaimer, the term of this patent is extended or adjusted under 35 U.S.C. 154(b) by 1379 days.

(21) Appl. No.: 14/444,571

(22) Filed: Jul. 28, 2014

(65) Prior Publication Data

US 2015/0107093 A1    Apr. 23, 2015

Related U.S. Application Data

(60) Provisional application No. 61/894,722, filed on Oct. 23, 2013.

(51) Int. Cl.
*H01M 4/13*      (2010.01)
*H01M 4/04*      (2006.01)
(Continued)

(52) U.S. Cl.
CPC ....... *H01M 4/1391* (2013.01); *H01M 4/0404* (2013.01); *H01M 4/13* (2013.01);
(Continued)

(58) Field of Classification Search
None
See application file for complete search history.

(56) References Cited

U.S. PATENT DOCUMENTS

| | | | | |
|---|---|---|---|---|
| 5,686,203 A | * | 11/1997 | Idota | H01M 4/485 |
| | | | | 429/218.1 |
| 6,048,372 A | * | 4/2000 | Mangahara | H01M 4/04 |
| | | | | 29/623.5 |

(Continued)

FOREIGN PATENT DOCUMENTS

| | | | | |
|---|---|---|---|---|
| CN | 1661831 | * | 8/2005 | C01D 15/02 |
| EP | 0905805 | * | 3/1999 | H01M 4/02 |

(Continued)

OTHER PUBLICATIONS

International Search Report & Written Opinion for International Application No. PCT/US2014/048680 dated Nov. 5, 2014.

(Continued)

*Primary Examiner* — Jonathan Crepeau
*Assistant Examiner* — Angela J Martin
(74) *Attorney, Agent, or Firm* — Christopher & Weisberg, P.A.

(57) ABSTRACT

A method of making a positive electrode includes forming a slurry of particles using an electrode formulation, a diluent, and oxalic acid, coating the slurry on a collector and drying the coating on the collector to form the positive electrode. The electrode formulation includes an electrode active material, a conductive carbon source, an organic polymeric binder, and a water soluble polymer. The diluent consists essentially of water.

7 Claims, 7 Drawing Sheets

(51) Int. Cl.

| | | |
|---|---|---|
| *H01M 4/50* | (2010.01) | |
| *H01M 4/52* | (2010.01) | |
| *H01M 4/62* | (2006.01) | |
| *H01M 10/05* | (2010.01) | |
| *H01M 4/1391* | (2010.01) | |
| *H01M 4/131* | (2010.01) | |
| *H01M 4/525* | (2010.01) | |
| *H01M 4/505* | (2010.01) | |
| *H01M 10/0525* | (2010.01) | |
| *H01M 10/058* | (2010.01) | |
| *H01M 4/139* | (2010.01) | |
| *H01M 4/38* | (2006.01) | |
| *H01M 4/02* | (2006.01) | |

(52) U.S. Cl.
CPC .......... *H01M 4/131* (2013.01); *H01M 4/139* (2013.01); *H01M 4/382* (2013.01); *H01M 4/50* (2013.01); *H01M 4/505* (2013.01); *H01M 4/52* (2013.01); *H01M 4/525* (2013.01); *H01M 4/622* (2013.01); *H01M 4/625* (2013.01); *H01M 10/058* (2013.01); *H01M 10/0525* (2013.01); *H01M 2004/021* (2013.01); *H01M 2220/20* (2013.01); *Y02E 60/10* (2013.01); *Y02P 70/50* (2015.11); *Y02T 10/70* (2013.01); *Y10T 29/49108* (2015.01)

(56) References Cited

U.S. PATENT DOCUMENTS

| | | | | |
|---|---|---|---|---|
| 6,103,421 | A * | 8/2000 | Torata | H01M 4/525 423/140 |
| 6,361,735 | B1 * | 3/2002 | Venkataramani | B28B 1/008 156/89.11 |
| 7,223,500 | B2 * | 5/2007 | Noh | H01M 10/0525 429/199 |
| 7,687,204 | B2 * | 3/2010 | Kang | H01M 10/052 429/324 |
| 8,263,260 | B2 | 9/2012 | Imachi et al. | |
| 9,236,612 | B2 | 1/2016 | Igarashi et al. | |
| 2004/0197667 | A1 * | 10/2004 | Noh | H01M 10/0525 429/326 |
| 2006/0204850 | A1 * | 9/2006 | Ham | H01M 4/131 429/223 |
| 2008/0254365 | A1 * | 10/2008 | Kim | C01G 31/006 429/221 |
| 2009/0220856 | A1 * | 9/2009 | Tian | H01M 4/5825 429/163 |
| 2009/0220859 | A1 * | 9/2009 | Yoon | H01M 4/131 429/220 |
| 2009/0220860 | A1 * | 9/2009 | Xi | C01G 30/00 429/220 |
| 2010/0075225 | A1 * | 3/2010 | Wilkins | H01M 4/0404 429/212 |
| 2010/0112443 | A1 * | 5/2010 | Blomgren | H01M 4/131 429/221 |
| 2010/0140448 | A1 * | 6/2010 | Koerwien | B29C 33/02 249/78 |
| 2010/0210745 | A1 * | 8/2010 | McDaniel | C09D 5/008 521/55 |
| 2011/0042609 | A1 * | 2/2011 | Park | H01M 4/366 252/182.1 |
| 2011/0143206 | A1 | 6/2011 | Muthu et al. | |
| 2012/0064229 | A1 | 3/2012 | Muthu et al. | |
| 2012/0064407 | A1 | 3/2012 | Muthu et al. | |
| 2013/0045417 | A1 * | 2/2013 | Hara | H01M 4/131 429/211 |
| 2013/0078365 | A1 | 3/2013 | Mori et al. | |
| 2013/0171521 | A1 | 7/2013 | Sugimoto et al. | |
| 2013/0236783 | A1 | 9/2013 | Kose et al. | |

FOREIGN PATENT DOCUMENTS

| | | | | |
|---|---|---|---|---|
| JP | H1186846 | * | 3/1999 | ............ H01M 10/40 |
| JP | 2001273895 | | 10/2001 | |
| WO | WO 2010/051565 | * | 5/2010 | .......... H01M 10/052 |

OTHER PUBLICATIONS

CN 201480051916.8 Office Action dated Sep. 28, 2017.
Zaghib, K. et al., "Safe and Fast-Changing Li-ion Battery with Long Shelf Life for Power Applications", Journal of Power Sources 196, 2011, pp. 3949-3954.
CN 201480051916.8 Office Action dated Dec. 14, 2018.

* cited by examiner

AQUEOUS CATHODE SLURRY

CROSS REFERENCE TO RELATED APPLICATIONS

This application claims priority from and the benefit of U.S. Provisional Application Ser. No. 61/894,722, entitled "PROCESSING TECHNIQUES OF AQUEOUS BINDER SYSTEMS FOR CATHODES OF LITHIUM ION BATTERIES", filed Oct. 23, 2013, which is hereby incorporated by reference.

BACKGROUND

The present disclosure relates generally to the field of batteries and battery modules. More specifically, the present disclosure relates to battery cells that may be used in vehicular contexts (e.g., xEVs), as well as other energy storage/expending applications.

Vehicles using electric power for all or a portion of their motive power (e.g., electric vehicles (EVs), hybrid electric vehicles (HEVs), plug-in hybrid electric vehicles (PHEVs), Micro-hybrid electric vehicles (MHEV), and the like, collectively referred to as "electric vehicles" (xEVs)) may provide a number of advantages compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems. For example, for an xEV battery system, it may be desirable for a battery system to be suitably packaged to properly function in a wide range of environmental conditions (e.g., heat, cold, moisture, vibrations, and so forth) that the battery system may encounter during operation.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In a first embodiment, a method of making a positive electrode includes forming a slurry of particles using an electrode formulation, a diluent, and oxalic acid, coating the slurry on a collector and drying the coating on the collector to form the positive electrode. The electrode formulation includes an electrode active material, a conductive carbon source, an organic polymeric binder, and a water soluble polymer. The diluent consists essentially of water.

In a second embodiment, a method of making a positive electrode slurry includes mixing a diluent consisting essentially of water with components of an electrode formulation and an organic acid, the components include a water soluble polymer, an electrode active material, a conductive carbon source, and an organic polymeric binder. The conductive carbon source is present in an amount of 4% by weight or less, based on the total weight of the electrode formulation; the organic polymer binder is present in an amount between 1.0% by weight and 1.5% by weight, based on the total weight of the electrode formulation; the water soluble polymer is present in an amount between 0.5% by weight and 1.0% by weight, based on the total weight of the electrode formulation; and the at least one electrode active material is present in an amount between 93.5% by weight and 94.5% by weight, based on the total weight of the electrode formulation such that a solid content of the positive electrode slurry is approximately 60% or more, based on the total weight of the slurry.

In a third embodiment, a positive electrode slurry includes a contact product of contact components including an electrode formulation. The electrode formulation includes a lithium-nickel-manganese-cobalt composite oxide as at least one electrode active material, a conductive carbon source, an organic polymeric binder, and a water soluble polymer the conductive carbon source is present in an amount of 4% by weight or less, based on the total weight of the electrode formulation; the organic polymer binder is present in an amount between 1.0% by weight and 1.5% by weight, based on the total weight of the electrode formulation; the water soluble polymer is present in an amount between 0.5% by weight and 1.0% by weight, based on the total weight of the electrode formulation; and the at least one electrode active material is present in an amount between 93.5% by weight and 94.5% by weight, based on the total weight of the electrode formulation such that a solid content of the positive electrode slurry is approximately 60% or more, based on the total weight of the slurry. The positive electrode slurry also includes an organic acid and a diluent. The diluent consists essentially of water.

In a fourth embodiment, a method of making a lithium ion electrochemical cell includes producing a positive electrode slurry using an electrode formulation, a diluent, and an acid. The positive electrode comprises a loaded weight of the electrode formulation between approximately 4 to approximately 16 milligrams per centimeter squared. The method also includes producing a negative electrode using a negative electrode slurry and an additional current collector, and forming the lithium ion electrochemical cell using components including the positive electrode, the negative electrode, and an electrolyte solution including a source of lithium ions. The lithium ion electrochemical cell retains approximately 85% or more discharge capacity after 200 cycles

DRAWINGS

These and other features, aspects, and advantages of the present disclosure will become better understood when the following detailed description is read with reference to the accompanying drawings in which like characters represent like parts throughout the drawings, wherein.

Figure 9:
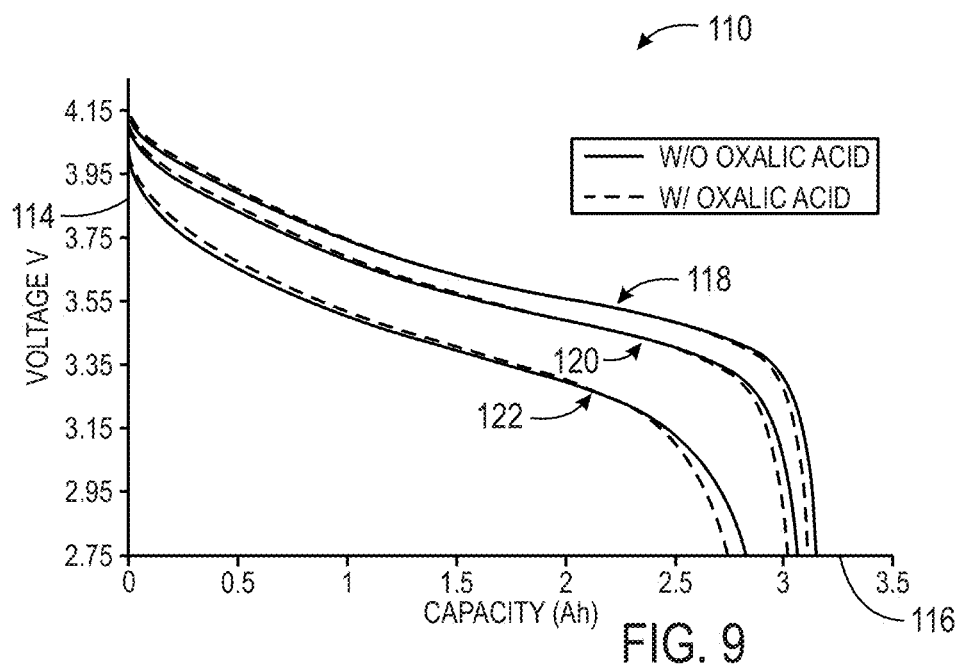
Figure 10:
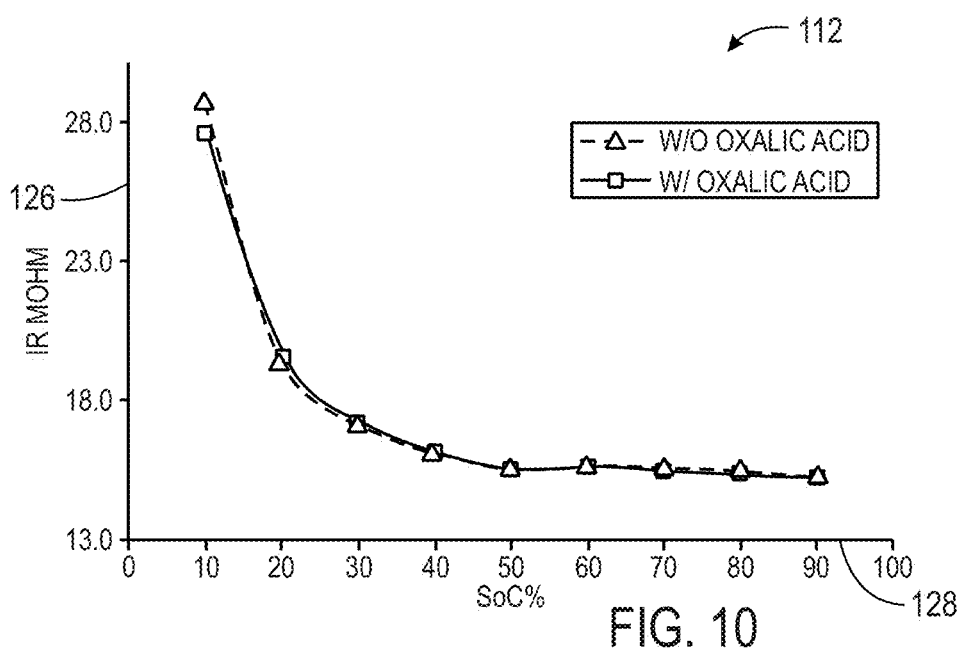

FIG. 9 is a plot of voltage as a function of capacity performed at varying C-rates, for positive electrodes produced using an electrode formulation with and without acid, in accordance with an embodiment of the present disclosure; and FIG. 10 is a plot of internal resistance as a function of state-of-charge (SoC) percentage, for positive electrodes produced using an electrode formulation with and without acid, in accordance with an embodiment of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The term "consisting of," when used in the context of a mixture of materials, is intended to be defined as limiting the recited components to those specifically recited, except for impurities ordinarily associated with the recited materials. The term "consisting essentially of" is intended to be defined as being limited to the specified materials or steps and those that do not materially affect the basic and novel approaches described herein. Additionally, it should be understood that references to "one embodiment" or "an embodiment" of the present disclosure are not intended to be interpreted as excluding the existence of additional embodiments that also incorporate the recited features.

When the term "approximately" is associated with a value, such as a measurement or a percentage, this term is intended to denote the standard deviation resulting from manufacturing and measurement tolerances, such that an approximate value takes into account the standard uncertainty associated with the particular measurement used to determine the value and standard manufacturing tolerances used to produce the value. Furthermore, the disclosure of approximate values and percentages below is also intended to encompass the disclosed value. For example, "approximately 10%" is also intended to disclose 10%.

Battery systems may be used to provide power to a number of different types of xEV's as well as other energy storage applications (e.g., electrical grid power storage systems). As one example, secondary lithium ion batteries may be utilized for powering all or a portion of an xEV or another power-consuming device. The secondary lithium ion batteries may include one or more battery modules, each battery module having a number of battery cells (e.g., electrochemical cells). The battery cells utilize lithium ions to shuttle electrons between the cathode (e.g., a positive electrode) and an anode (e.g., a negative electrode), and are rechargeable (i.e., the electrochemical reaction used to generate power is reversible). Generally, an electrolyte provides a source of ions (e.g., the lithium ions). The wide variety of possible battery cell materials can produce varying properties of the battery. Accordingly, the secondary lithium ion batteries can be employed in a variety of devices in addition to xEV's, such as personal electronic devices (e.g., laptop computers and cellular telephones), and even space shuttles. Because of the various implementations associated with secondary lithium ion batteries, and the corresponding variety in power requirements, it may be desirable to use any of a wide variety of materials for the active components of these batteries.

Secondary lithium ion batteries may include one or more electrochemical cells, where each electrochemical cell includes an anode and cathode, and each anode and cathode have associated electrochemically active materials. The cathodes and anodes may be produced by a variety of methods. In accordance with certain aspects of the present disclosure, the cathode is a coated positive electrode, where a metallic strip or similar feature is coated with an electrochemically active (e.g., cathode active) material. The coating is produced by a method in which a slurry of the cathode active material (in combination with other components) in a liquid is formed. The slurry, which may have a viscosity similar to a paste, may then be used to coat the metallic element, which may be referred to as a metallic collector (e.g., aluminum, stainless steel, nickel), or a foil. The coated collector may then be dried to remove the liquid, resulting in the coated electrode (e.g., a coated positive electrode).

A common liquid used for this process (e.g., to form the slurry) is a mixture of water and n-methyl pyrrolidone (NMP), or water and similar solvents (e.g., lactam-based solvents). NMP and similar solvents are excellent solvents that enable very good dispersion of the cathode active material in the slurry, which ultimately produces cathodes having relatively higher performance compared to when they are not used. Unfortunately, NMP and similar solvents are generally considered to be undesirable from a cost and process standpoint, among others. For example, NMP is significantly more expensive than water, and processes employing these types of solvents often involve various solvent recycling procedures, which can increase the capital cost and decrease the throughput associated with the production of electrodes. Therefore, it is presently recognized that it may be desirable to form a cathode slurry using water as the only diluent. That is, the cathode slurry does not include NMP or similar solvents. In this way, production costs for positive electrodes used in the electrochemical cells of secondary lithium batteries may be decreased. In addition, the positive electrodes may be generated by an environmentally friendly process (e.g., a process that does not utilize organic solvents).

It is presently recognized that as cathode active materials that produce electrochemical cells with relatively higher voltages (e.g., nominal voltage, peak charge voltage, average voltage) are used, particle agglomeration and particle distribution during slurry formation becomes increasingly problematic, especially in water. It is believed that this is due to the entrapment or similar association of water within the agglomerate, such that even after a drying process, residual water may still remain. This water can have an extremely deleterious effect on the electrochemical processes that take place at the cathode, especially at higher voltages. Therefore, cathode slurries using water as the only diluent may include additives to mitigate particle agglomeration and distribution. For example, the cathode slurry may include surfactants and viscosity enhancers that facilitate particle dispersion. However, certain additives may alter a pH of the cathode slurry. Indeed, it is presently recognized that cathode slurry pH values outside of certain ranges (e.g., above pH 9) may affect dispersion homogeneity, particle size distribution of the water-insoluble components in the cathode slurry (e.g. electrode active materials), and can also have negative effects on the metallic components of the electrode (e.g., the metallic collector). These factors may all contribute to poor electrode performance. Accordingly, it is presently recognized that it may be desirable to adjust a pH of the cathode slurry used to generate positive electrodes for secondary lithium batteries.

The present disclosure addresses these and other issues using an approach wherein during formation of the cathode, a slurry is produced using only water, in combination with a pH modifier (e.g., an organic acid) to adjust a pH of the cathode slurry to a certain level. As discussed in detail below, these approaches also provide what are believed to be surprising results in that cathodes produced according to the present technique may display better overall performance, even when compared to industry-standard processes that utilize water-NMP solvent mixtures. Accordingly, not only do the present techniques enable the elimination of undesirable solvents, but may also enable the production of cathodes having superior performance.

Figure 1:
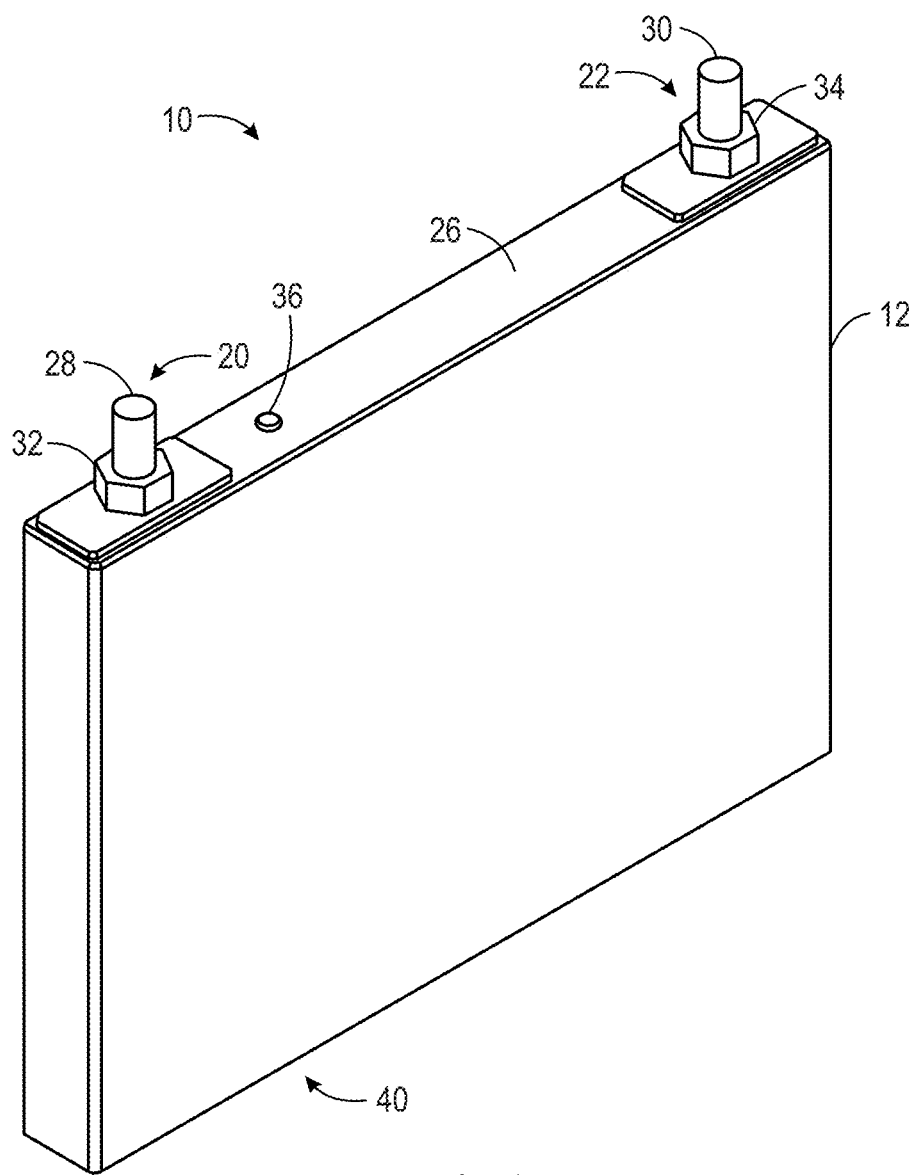
FIG. 1 is perspective view of a prismatic battery cell, in accordance with an embodiment of the disclosure.

With the foregoing in mind, FIG. 1 is a perspective view of a battery cell 10 (e.g., of a secondary lithium battery module), in accordance with an embodiment of the present approach. In certain embodiments, the battery cell 10 may be one of a plurality of battery cells in the battery module, such as those used in the xEV. The battery cell 10 illustrated in FIG. 1 includes a packaging 12 that may be metallic (e.g., made from steel, aluminum, or another suitable metal) or may be polymeric (e.g., acrylonitrile butadiene styrene (ABS), a polystyrene (PS), a polyimide (PI), or another suitable polymer or plastic or combination thereof). Further, the packaging 12 of the battery cell 10 generally has the shape of a rectangular prism. However, in other embodiments, the packaging 12 may have a different shape (e.g., cylindrical, oblong cylindrical, or a different prismatic shape) according to the energy density and size constraints for the battery cell 10 and or the battery module. In certain embodiments, the packaging 12 may be provided having a single open face (e.g., a bottom face 16) for insertion of a coil assembly.

As illustrated in FIG. 1, the battery cell 10 includes a positive electrode 20 (e.g., a cathode) and a negative electrode 22 (e.g., an anode) extending through a top face 26. In certain embodiments, terminals 28 and 30 (e.g., protruding portions) of the positive and negative electrodes 20 and 22, respectively, include bolts (stud fasteners), wherein the head of the bolt is disposed within the packaging 12 (not shown) and threaded shafts of the bolts protrude through the top face 26. A pair of nuts 32 and 34 may be used to secure the electrodes 20 and 22 onto the packaging 12 and provide a compressive force to hermetically seal the battery cell 10 at the terminals 28 and 30. In certain embodiments, the battery cell 10 may also include a rivet 36 that may be used to seal a small opening (fill hole) in the top face 26 after introducing electrolyte into the battery cell 10.

The electrolyte of the battery cell generally includes a source of lithium ions (e.g., a lithium salt) dissolved within a solvent mixture. Any source of lithium ions may be used in the electrolyte, and will be readily apparent to those of ordinary skill in the art. Indeed, the electrolyte will also generally include one, two, three, or more solvents and optional additives to facilitate ion transfer and electrode stability. By way of example, such solvents may include alkyl esters, cyclic alkyl carbonates, non-cyclic alkyl carbonates, vinyl carbonates, and mixtures thereof. Additives may include borates, carbonates, and the like.

In accordance with certain embodiments of the present disclosure, the electrodes 20 and 22 may be made of a conductive collector material (hereinafter "collector"), such as, aluminum, stainless steel, nickel, copper, or tin, depending on the desired physical properties (e.g., yield strength, electrical resistivity, chemical compatibility, and so forth). Additionally, the electrodes 20 and 22, in some embodiments, are coated electrodes in which an electrode active material is coated onto the collector, as will be discussed in further detail below. The electrode active material enables the electrodes 20 and 22 to store and transfer ions (e.g., lithium ions) during charging and discharging cycles. Whether the electrode is a cathode or an anode is generally determined by the combination of electrode active materials used for each. Thus, the electrode active materials will generally be different.

Generally, the power characteristics (e.g., power retention, cycle life, and so forth) of each battery cell may depend, at least in part, on various parameters of the cathode active material. Example parameters of the cathode active material that can affect the power characteristics include the chemical composition of the cathode active material, as well as the physical properties of the cathode (e.g., the porosity and surface roughness of the cathode active material when coated onto an electrode). For instance, the chemical composition of the cathode active material may be considered to affect the cathode's ability to undergo a particular electrochemical transformation, while the physical properties of the cathode active material may be considered to affect the cathode's ability to intercalate (incorporate) and deintercalate (lose) lithium ions, which in turn can affect lithium ion availability for the electrochemical transformation.

These parameters will generally determine the overall suitability of the cathode active material for the conditions under which the battery cell 10 is placed during the normal course of operation. For example, certain cathode active materials may be suitable for incorporation into battery cells operating at 3.0 Volts (V), but may be inadequate for other implementations, such as battery cell operation at closer to 4.0 V. The nominal voltage, average voltage determined using standard testing conditions, and/or charge limit (i.e., peak charge voltage) of a battery cell produced using particular types of cathode active materials will generally be good indicators as to whether the cathode active material might be suitable for a particular operational voltage.

For certain implementations discussed herein, such as when the battery system (e.g., one or more battery cells 10) is to be utilized in a vehicular context (e.g., an xEV such as a PEV, HEV, or mHEV), it may be desirable to utilize cathode active materials (e.g., positive electrode active materials) having a nominal voltage of at least 3.0 V. In vehicular contexts, the weight of the battery system will generally affect the efficiency of the xEV, since the battery will generally provide power that is, in some form, used to facilitate motion of the xEV. Accordingly, it may be desirable to use cathode active materials having higher nominal voltages (e.g., 4.0 V or more) to reduce weight (e.g., by reducing the number of cells needed to meet a particular voltage rating) while also enabling operation at a relatively high voltage (e.g., 48 V Micro-hybrid battery systems in some contexts).

In certain processes, a positive electrode for battery cells (e.g., the battery cell 10, an electrochemical cell) is produced by coating the collector with a cathode slurry (a positive electrode slurry) including the cathode active material and other additives, as discussed in further detail below. A common liquid used for this process (e.g., to form the cathode slurry) is a mixture of water and n-methyl pyrrolidone (NMP), or water and similar solvents (e.g., lactam-based solvents). NMP and similar solvents are excellent solvents that enable very good dispersion of the cathode active material in the cathode slurry, which ultimately produces cathodes having relatively higher performance compared to when they are not used. Unfortunately, NMP and similar solvents are generally considered to be undesirable from a cost and process standpoint, among others. For example, NMP is significantly more expensive than water, and processes employing these types of solvents often involve various solvent recycling procedures, which can increase the capital cost and decrease the throughput associated with the production of electrodes.

Anodes used in battery modules, such as secondary lithium ion batteries, can be formed from a variety of anode active materials, with graphitic carbon being one example. In a general sense, anode active materials can be coated onto the collector to form a coated anode using a slurry approach similar to that noted above with respect to the cathode, using only water (i.e., no NMP-like solvents), with relatively good success and acceptable performance for a wide variety of applications. Unfortunately, the success of water-only slurries (i.e., the replacement of a water-NMP liquid system with an all-water liquid system) in anode production does not necessarily translate to processes involving cathode active materials.

For example, as noted above, the performance of a given battery is dependent on various chemical and physical parameters of the cathode active material. As the nominal voltage of a battery cell produced using a cathode active materials increases, it becomes increasingly difficult to obtain acceptable battery performance when the slurry is produced using only water as the liquid (e.g., diluent) for a variety of reasons. For instance, certain components of the electrode formulation (e.g., the cathode active material) may be insoluble in water. As such, additives such as viscosity enhancers and/or dispersants (e.g., cellulose derivatives) are added to the cathode slurry to maintain the insoluble components suspended in the water, as discussed in further detail below. In this way, the cathode active material and other water insoluble components may form a homogenous cathode slurry that may be used to produce a continuous and uniform coating on the collector.

Indeed, a method of making an electrochemical cell in accordance with the present embodiments may include producing a positive electrode using the approaches described herein. A negative electrode may also be produced using, for example, a slurry-based approach in which a separate current collector is coated with a separate slurry. However, the negative electrode may be made using other techniques. The positive and negative electrodes, as well as an electrolyte solution (e.g., any mixture of any of the electrolyte components described herein), may be used to produce the electrochemical cell.

Regarding the techniques described herein to produce the positive electrode and its associated slurry used to coat its respective current collector, it is presently recognized that as cathode active materials that produce electrochemical cells with relatively higher voltages (e.g., nominal voltage, peak charge voltage, average voltage) are used, particle agglomeration during slurry formation becomes increasingly problematic, especially in water. It is believed that this is due to the entrapment or similar association of water within the agglomerate, such that even after a drying process, residual water may still remain. This water can have an extremely deleterious effect on the electrochemical processes that take place at the cathode, especially at higher voltages, which in turn decreases battery performance. Therefore, in certain embodiments, a surfactant may be provided to the cathode slurry to mitigate particle agglomeration. By way of example, surfactants such as carboxylate derivatives, sulfate derivatives, polyoxoethylene derivatives, any other suitable surfactant, and combinations thereof may be used to mitigate particle agglomeration.

While the addition of additives such as viscosity enhancers and surfactants, among others facilitate formation of stable and homogenous water-only cathode slurries, these additives may cause undesirable and, at times, unpredictable changes in pH of the cathode slurry. For example, a cathode slurry including the cathode active material, viscosity enhancer (e.g., cellulose derivative), and water may have a pH above 10. In addition to being difficult to make, cathode slurries having such alkaline pH may produce positive electrodes having poor performance. It is now recognized that at a pH above 9, surface chemistry of the cathode active material may change, and thereby affect dispersion homogeneity and particle size distribution of the water-insoluble electrode components (e.g., the cathode active material) in the cathode slurry.

Further, the alkalinity of the solution can also have a deleterious effect on the collector (e.g., the metallic current collector) material. For example, sufficiently alkaline pH levels can oxidize the current collector material such as Al. As a consequence, adhesion properties of the electrode components onto the collector may be decreased, resulting in an uneven coating, surface pinholes, and reduced electronic conduction of the positive electrode. Accordingly, present embodiments include a slurry method in which a pH modifier (e.g., an acid) is used to adjust the pH of the cathode slurry to produce a homogeneous water-only cathode slurry that may be used to coat the collector. It should be noted that the water used to generate the cathode slurry has a pH between approximately 6.5 to approximately 7.5. Battery performance data is also presented below, which shows the enhanced performance achieved when using electrodes produced in accordance with the present techniques.

Figure 2:
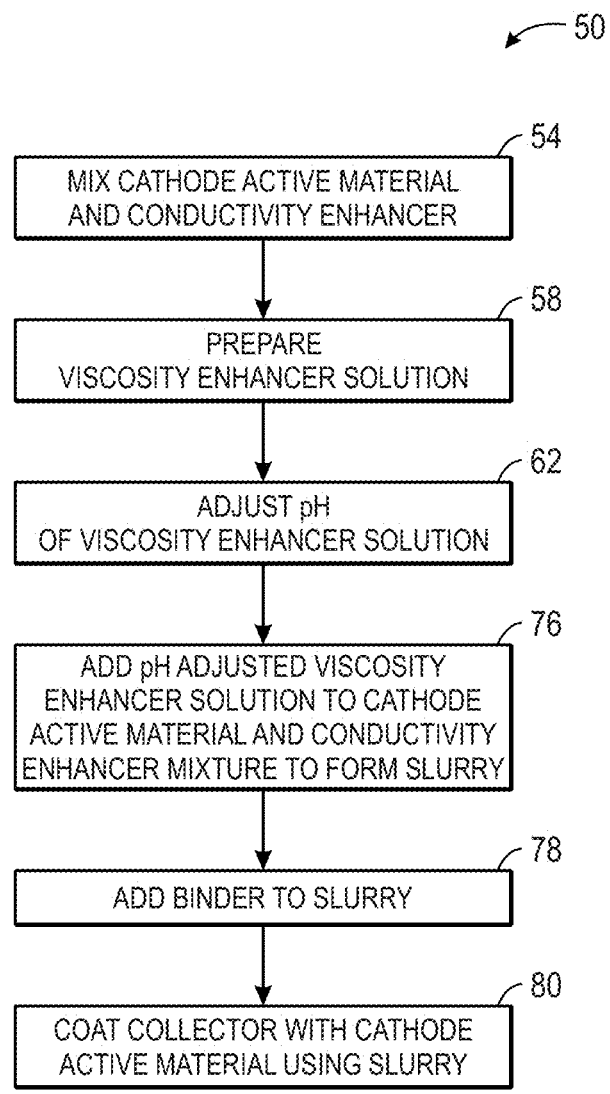
FIG. 2 is a process flow diagram of a method for producing a coated positive electrode using a slurry produced using only water as a liquid, in accordance with an embodiment of the present disclosure.

Turning now to FIG. 2, a flow diagram of an embodiment of a method 50 for generating a positive electrode (e.g., the positive electrode 20) using an electrode formulation made with water as the only solvent is depicted. The method includes mixing the cathode active material and a conductivity enhancer (block 54). In general, the cathode active material and the conductivity enhancer are dry-mixed. However, in certain embodiments, the cathode active material and the conductivity enhancer may be wet-mixed (e.g., with water). By way of example, the cathode active material may be a lithium metal oxide (LMO) component. As used herein, lithium metal oxides (LMOs) may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_{1/3}CO_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$). Again, the positive electrode material may include only a single active material (NMC), or may include a mixture of materials such as any one or a combination of: NMC, NCA, LCO, LMO-spinel, and the like.

It should be noted that the present approaches may also be applicable to other types of cathode active materials, such as lithium metal phosphate electrode active materials. However, such materials are generally not as sensitive to the presence of water during preparation. Indeed, such lithium metal phosphate materials may generally not be considered to be high voltage cathode materials, as they typically have an average voltage lower than 3.6V (e.g., about 3.0-3.5 V).

Generally, the positive electrode active material may be present in any amount, such as in an amount between approximately 90% by weight and 99% by weight, based on the weight of the electrode formulation. More specifically, the positive electrode active material may be present in an amount between approximately 91% by weight and approximately 98% by weight, between approximately 92% by weight and approximately 96% by weight, between approximately 93% by weight and 95% by weight, or between approximately 93.5% by weight and 94.5% by weight, based on the total weight of solids used to form the slurry. In one embodiment, the positive electrode active material may be present in an amount of approximately 94.0% by weight, based on the total weight of solids used to form the slurry. By having a high loading of the positive electrode active material (e.g., between approximately 90% by weight and 99% by weight) in the cathode slurry, drying time for the coated collector may be reduced (e.g., due to less water) and a uniform coating may be achieved.

The conductivity enhancer may be added to the electrode formulation to enable conduction between the cathode active material and the collector. For example, although the cathode active material readily undergoes an electrochemical reaction at its particular ionization potential, it may be desirable to enhance the conductivity of the coating or the collector to enable the battery cell 10 charge and/or discharge at a desired rate. Accordingly, the conductivity enhancer may be provided as one of a plurality of components used to form the cathode slurry. The conductivity enhancer may include, but is not limited to, carbon (e.g., carbon black, flake graphite, and the like), metal, metal nitrides, metal carbides, and metal borides. Example carbon blacks may include acetylene black, furnace black, lamp black, graphite, carbon fibers, or any combination thereof. The conductivity enhancer may be present in any suitable amount. For example, slurries used to produce lithium-nickel-manganese-cobalt composite oxide electrodes may include between approximately 0% by weight to approximately 10% by weight of the conductivity enhancer.

As discussed above, certain components of the electrode formulation (e.g., the cathode active material) may be insoluble in water. Therefore, the electrode formulation may include a viscosity enhancer and/or dispersant to facilitate forming a homogenous cathode slurry. Accordingly, the method 50 also includes preparing a viscosity enhancer solution (block 58) together or separate from the mixture of the cathode active material and conductivity enhancer. The viscosity enhancer may enhance the ability of the cathode active material, the conductivity enhancer, and any other electrode formulation components (e.g., a binder) to form a uniform coating on the collector. For example, the viscosity enhancer may increase a viscosity of the cathode slurry to facilitate suspension of the water-insoluble particles in the water, and thereby generate the homogenous cathode slurry. By coating the collector with the homogenous cathode slurry, smooth and uniform coatings may be achieved.

In certain embodiments, the viscosity enhancer may include a water-soluble polymer capable of increasing a viscosity such that the cathode slurry may have a viscosity similar to a paste. For example, the viscosity enhancer may yield a cathode slurry having a viscosity range of between approximately 2000 centipoise (cps) to approximately 3000 cps. In one embodiment, the cathode slurry has a viscosity of approximately 2500 cps. By having a viscosity range between approximately 2000 cps to approximately 3000 cps, the positive electrode active material and other water insoluble components of the cathode slurry may be dispersed (i.e., suspended) in the water. That is, the cathode slurry forms a homogenous mixture. The homogenous cathode slurry may facilitate forming a smooth and uniform coating on the collector. Examples of viscosity enhancers that may be used in the cathode slurry may include carboxylate and hydroxylate functionalized cellulose derivatives such as, but not limited to, carboxymethylcellulose (CMC), methylcellulose, ethylcellulose, hydroxymethylcellulose, hydroxyethylcellulose, hydroxypropylcellulose, hydroxyethyl methyl cellulose, or any other suitable cellulose derivative, or combinations thereof. In other embodiments, the viscosity enhancer many include polycarboxylic acids, polyacrylamides, polyvinylpyrrolidones, polyethylene oxides, gums (e.g., xanthenes gums, carrageenan, guar gum), agar, or starch. In this way, the components of the electrode formulation may remain suspended (e.g., dispersed) in the cathode slurry, and thereby mitigate settling (e.g., separation) of the electrode formulation components and the water.

The viscosity enhancer may be present in any amount appropriate for obtaining a desired viscosity for the cathode slurry. By way of example, the viscosity enhancer may be present in an amount ranging from 0.1% by weight to approximately 5% by weight, such as between approximately 0.3% by weight and approximately 3% by weight, between approximately 0.4% by weight and approximately 2% by weight, or between approximately 0.5% by weight and approximately 1.0% by weight, based on the weight of the slurry solids. In one embodiment, the viscosity enhancer may be present in an amount of approximately 0.5% by weight, based on the total weight of solids used to form the slurry.

As discussed above, addition of additives such as viscosity enhancers and surfactants to the electrode formulation may produce a cathode slurry having a pH outside a desired range. For example, in certain embodiments, the additives may produce a cathode slurry having a pH between approximately 11 and approximately 12. However, the present embodiments are applicable to any situation in which it may be desirable to reduce pH. As noted above, high pH levels may deleteriously affect coating uniformity on the collector as well as collector surfaces. Accordingly, in one aspect of the present embodiments, before mixing the cathode active material with the viscosity enhancer, a pH of the viscosity enhancer solution is adjusted (block 62). As should be noted, the pH of the cathode slurry may be adjusted at any time before coating the collector. In other aspects of the present embodiments, the pH of the viscosity enhancer solution may be adjusted after mixing with other electrode components to form the cathode slurry. Accordingly, the pH of the cathode slurry may also be adjusted after mixing the viscosity enhancer with the other electrode formulation components (e.g., the cathode active material and conductivity enhancer). In other embodiments, the pH of the viscosity enhancer solution is not adjusted before mixing with other electrode formulation components. As such, the pH is adjusted after the cathode slurry is formed. Indeed, the present embodiments are intended to encompass all pH adjustment methods and variations that may be used to achieve the pH levels desired herein.

The pH may be adjusted by adding a pH modifier to the viscosity enhancer and/or cathode slurry. The pH modifier may include oxoacids (also referred to as oxyacids) such as, but not limited to, carboxylic acid derivatives (e.g., organic acids). The oxoacid may be a solid, liquid, or a gas at room temperature. In one embodiment, the oxoacid may have a composition that is amenable to breakdown into carbon dioxide ($CO_2$) under the conditions used during electrode formulation and/or during operation of the battery cell 10. As such, the oxoacid may be easily removed after coating the collector with the cathode slurry. For example, the oxoacid may include straight chain and/or cyclic organic acids having between one and six carbons and a molecular weight between approximately 40 grams/mol (g/mol) and 200 g/mol. In certain embodiments, the organic acids have a pKa (i.e., a measure of acidity for organic compounds) between approximately 3.5 and approximately 5.5. By way of example, the organic acids include, but are not limited to, carbonic acid, oxalic acid, acetic acid, citric acid, benzoic acid, formic acid, any other suitable acid, or combinations thereof. It is recognized that these organic acids generally contain less impurities compared to stronger acids, such as hydrogen chloride (HCl), sulfuric acid ($H_2SO_4$), nitric acid ($HNO_3$). Further, the by-products from certain of these organic acids may not disturb the electrochemistry of the electrochemical cells (e.g., the battery cell 10). Therefore, positive electrode performance is less likely to be affected due to undesirable impurities associated with the stronger inorganic acids. Moreover, certain organic acids, such as oxalic acid and similar acids, may readily decompose to generate $CO_2$, which has little to no effect on battery cell performance. In addition, these organic acids are not expected to react with the collector surfaces. As such, degradation (e.g., corrosion or dissolution) of the collector may be mitigated during coating.

Depending on the viscosity enhancer used in the electrode formulation, the pH modifier may be present in an amount ranging from between approximately 0.1% to approximately 0.5%, based on the weight of the cathode slurry. In certain embodiment, the pH modifier may decrease the pH of the viscosity enhancer and/or the cathode slurry from between approximately 10 to approximately 12 to a pH between approximately 7 to approximately 9.

In addition to or in lieu of, in certain embodiments, the viscosity enhancer solution may include a buffer. The buffer may mitigate changes in pH that may be associated with mixing the viscosity enhancer with other electrode formulation components (e.g., the polymeric binder). Examples of buffers that may be utilized include, but are not limited to, succinic acid, 3-[N-Tris(hydroxymethyl)methylamino]-2-hydroxypropanesulfonic Acid (TAPSO), N-tris(hydroxymethyl)methylglycine (Tricine), tris(hydroxymethyl)methylamine (TRIS), N,N-bis(2-hydroxyethyl)glycine (Bicine), and 3-{[tris(hydroxymethyl)methyl]amino}propanesulfonic acid (TAPS).

Figure 3:
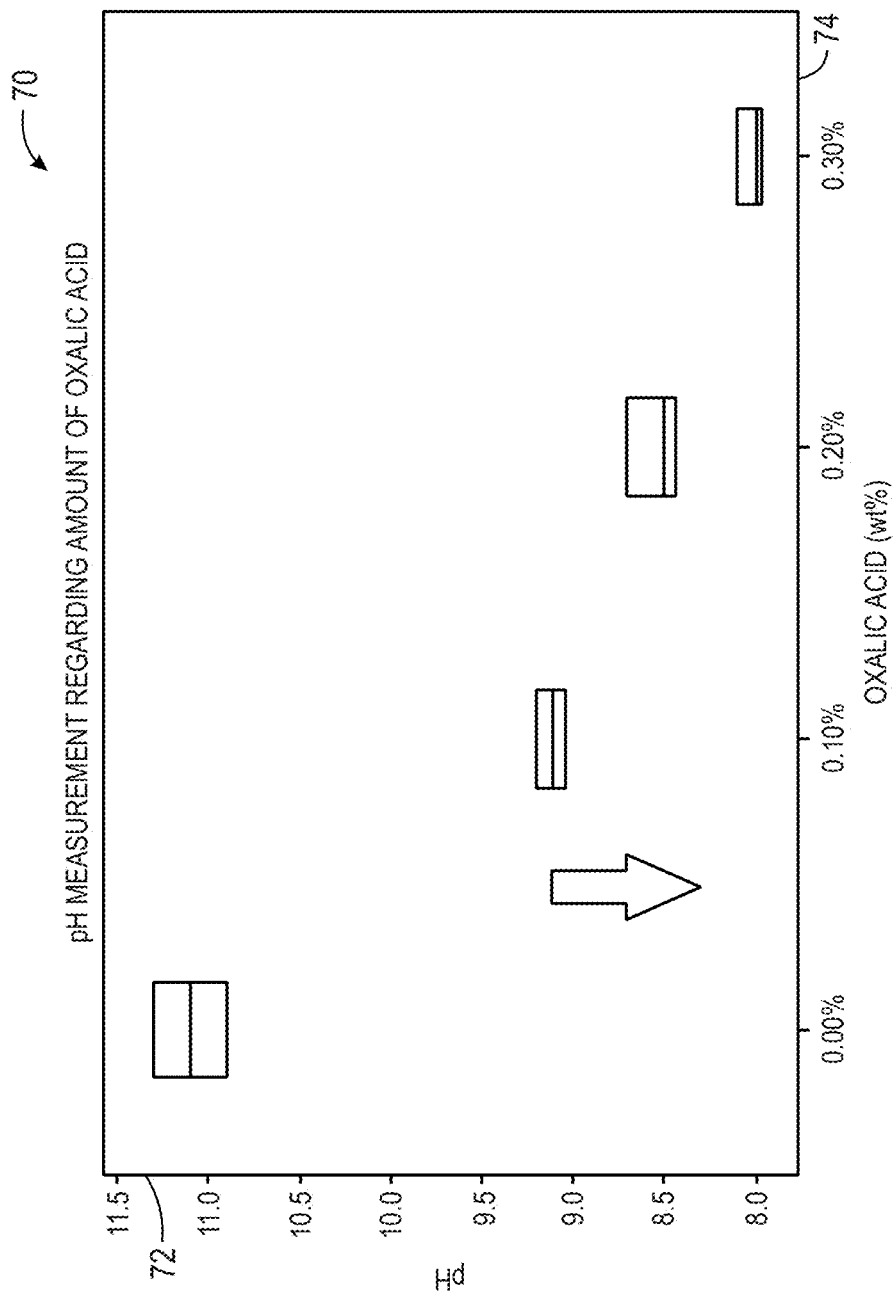
FIG. 3 is a plot of pH as a function of weight percent acid in the slurry used to produce the coated positive electrode, in accordance with an embodiment of the present disclosure.

FIG. 3 is a plot 70 illustrating experimental data for a cathode slurry pH 72 as a function of oxalic acid concentration 74 measured in weight percent based on a total weight of the cathode slurry. As discussed above, addition of the viscosity enhancer to the electrode formulation may produce a cathode slurry having a pH above 9. For example, as illustrated in plot 70, a cathode slurry that does not include the pH modifier (e.g., the organic acid) may have a pH range between approximately 10.5 and approximately 11.5. This alkaline pH may result in degradation of the collector (e.g., corrosion and/or dissolution) and may affect the surface chemistry of the cathode active material, as discussed above. This may consequently decrease performance of the positive electrode (e.g., the positive electrode 10). As illustrated in plot 70, addition of the pH modifier to the cathode slurry reduces the pH to a desirable range (e.g., a pH below 9), and thereby mitigates the undesirable pH effects.

Returning to the FIG. 2, once the pH of the viscosity enhancer solution is adjusted, the method 50 includes adding the viscosity enhancer solution to the cathode active material and conductivity enhancer mixture to form the cathode slurry (block 76). As discussed above, the electrode formulation includes at least one binder. The materials used to construct the positive electrode, though they are coated onto the collector together, may not necessarily maintain a continuous structure. Therefore, at least one binder (e.g., a polymeric binder) may be added to the cathode slurry (block 78) to keep the positive electrode materials together and provide a continuous and uniform coating on the collector. Example binders may include polymers, copolymers (e.g., block copolymers, terpolymers, and so forth), or a combination thereof. For example, the polymers may include polyolefins (e.g., polyethylene, polypropylene, polybutylene polymers), fluorinated polymers (e.g., prepared from fluorine-containing monomers), polymers or copolymers prepared from conjugated dienes, vinylarenes, acrylates, acrylonitriles, acrylamides, or any combination thereof. By way of further example, the polymeric binder may include a monovinylarene-conjugated diene copolymer rubber, such as a styrene-butadiene rubber (SBR), and derivatives thereof.

The polymeric binder may be present in any suitable amount. By way of example, for lithium-nickel-manganese-cobalt (NMC) composite oxide electrodes, the polymeric binder may be present in an amount ranging from 0% by weight and approximately 5% by weight, such as between approximately 0.1% by weight and approximately 4% by weight, between approximately 0.5% by weight and approximately 3% by weight, or between approximately 1.0% by weight and approximately 1.5% by weight.

As noted above, the cathode slurry composition may include various other additives used and known to those of ordinary skill in the art. However, because the present approaches involve the subtle interplay of the materials noted above, namely the cathode active material, the conductivity enhancer, the polymeric binder, the viscosity enhancer, the pH modifier, and the liquid (e.g., diluent), it may be desirable for the cathode slurry to consist essentially of, or consist of, these materials. Indeed, in some embodiments, the cathode slurry may consist essentially of, or consist of, the cathode active material, the conductivity enhancer, the polymeric binder, the viscosity enhancer, the pH modifier, and the liquid.

Presented below, in Table 1, are example combinations of ranges for the cathode slurry compositions that may be used to coat the positive electrode active material onto the collector. Cathode slurries having the compositions represented in Table 1 exhibited desirable slurry properties (e.g., viscosity, homogeneity) suitable for use in coating the collector. Generally, the cathode active material, conductivity enhancer, polymeric binder, and viscosity enhancer will be represented in terms of their relative contribution to the weight of solids in the slurry, as the solids are generally incorporated into the coated electrode formed using the slurry. In accordance with an embodiment of the present disclosure, the weight of solids in the cathode slurries is approximately 60% or more. It is recognized that cathode slurries having approximately 60% or more solid content produce a smooth electrode coating having little to no pinholes, as discussed below with reference to FIG. 4.

TABLE 1

| Electrode Formulation | Range 1 | Range 2 | Range 3 | Range 4 |
|---|---|---|---|---|
| Example Slurry Compositions | | | | |
| % by weight of electrode formulation | | | | |
| Electrode Active Material | 90-99 | 92-96 | 93-95 | 93.5-94.5 |
| Conductivity Enhancer (e.g., CB) | 0-10 | 0.5-8 | 2-6 | 3-5 |
| Polymeric Binder | 0-5 | 0.1-4.0 | 0.5-3.0 | 1.0-1.5 |
| Viscosity Enhancer (e.g., CMC) | 0.1-5.0 | 0.3-3.0 | 0.4-2.0 | 0.5-1.0 |
| Additional Slurry Components | | | | |
| % by weight of slurry | | | | |
| pH modifier | 0.05-0.5 | | | |
| Total Liquid | 10-60 | 25-55 | 20-50 | 30-40 |

After preparation of the cathode slurry, the method 50 also includes coating the collector with the cathode active material (block 80). The collector may be coated with one or more layers of cathode active material using any suitable coating technique. For example, in accordance with the techniques of the present disclosure, methods of coating the metallic collector included knife coating, notched bar coating, dip coating, spray coating, electrospray coating, gravure coating, or ultrasonic coating. The coated collector may then be dried to remove the liquid, resulting in the coated electrode (e.g., a positive electrode). The coated collector may be dried using any suitable drying method, for example by drying in an oven at an elevated temperature (e.g., between approximately 40° C. and approximately 65° C.).

In certain embodiments, the coated positive electrode may be dried in approximately 5 minutes or less at temperatures of approximately 65° C. or less. For example, in one embodiment, the coated positive electrode may be dried at a temperature between approximately 40° C. and approximately 60° C. In another embodiment, the coated positive electrode may be dried at a temperature between approximately 45° C. and approximately 55° C. Because of the high solid content of the cathode slurry (e.g., 60% or more), the coated electrode may not have a large amount of water that could result in longer drying times. An air fan may also be used to evenly distribute heat across the coated electrode surface and decrease the drying time. Additionally, lower drying temperatures (e.g., less than 65° C.) for positive electrodes coated with cathode slurries that utilize water as the only diluent may help mitigate the effects of higher drying temperatures associated with NMP-based cathode slurries. For example, drying the coated positive electrode at temperatures above 65° C. may result in undesirable decomposition of electrode formulation components, alter oxidation states of the cathode active materials, affect mechanical properties of the collector, and coating integrity. As such, the positive electrode may have reduced performance Therefore, the combination of cathode slurries having 60% solid content, slurry pH, low drying temperatures, and decreased drying times significantly reduce or eliminate degradation of the collector surfaces coated with water-only slurries, such as those disclosed herein, and produce smooth and uniform coated electrodes.

Figure 4:
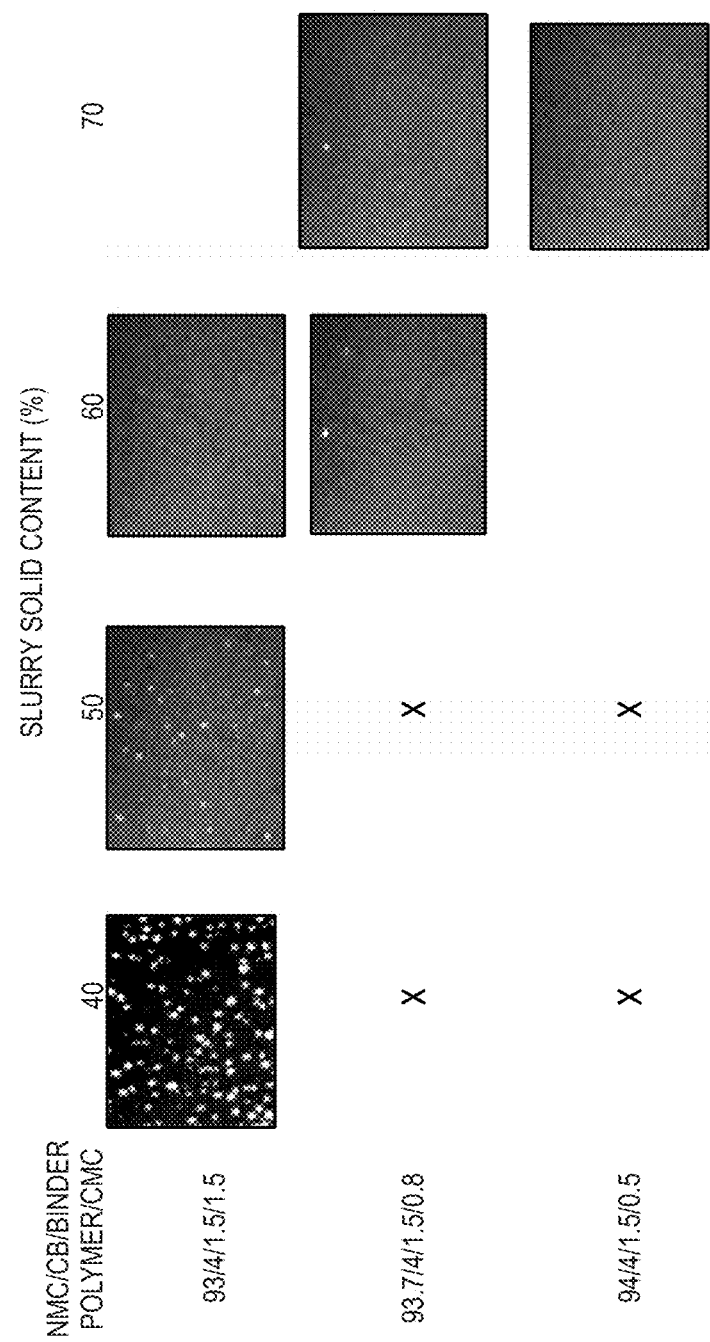
FIG. 4 is a collection of microscopic images of an outer surface of coated positive electrodes produced using slurries having different solid content, in accordance with an embodiment of the present disclosure.

FIG. 4 illustrates microscope images representative of collectors coated with cathode slurries having different solid content. As shown, collectors coated with cathode slurries having less than 60 wt % solid content resulted in positive electrodes having surface pinholes, and are expected to have poor performance. However, as is readily apparent by the microscopic images, positive electrodes produced with cathode slurries having a solid content of 60% or more result in smooth coatings with little to no surface pinholes. By way of non-limiting example, surface analysis of the positive electrodes coated with the cathode slurries disclosed herein may yield a coating volume density of between approximately 2 grams/cubic centimeter ($g/cm^3$) and approximately 4 $g/cm^3$. Additionally, loading weight density (e.g., the amount of the cathode active material available for intercalation/deintercalation) of the cathode active material in the positive electrodes is between approximately 5 milligrams/square centimeter ($mg/cm^2$) and approximately 18 $mg/cm^2$ of the cathode active material. These coating densities are similar to or better than those seen with NMP-based cathode slurries.

As noted above, the electrodes (e.g., the positive electrode 20) produced according to the present technique may be coated electrodes in which the electrode active material is coated onto the surface of a collector, which is often a conductive metal that serves as an interface for a battery terminal Indeed, the present disclosure encompasses positive and negative electrodes produced according to the embodiments described above, where any one of the components described above may be used with any other of the components described above in any combination. Thus, secondary lithium ion batteries may be produced by incorporating, among other things, positive electrodes produced in accordance with the techniques described herein, an electrolyte (which will generally include a lithium ion source and a solvent for dissociating the source), and an anode, which may be produced according to an all-water slurry method as noted above (or any other method). In accordance with an embodiment, the battery may be an automotive battery integrated into the framework of an xEV.

Batteries (e.g., the battery cell 10) incorporating the present positive coated electrodes may display excellent performance One common measure of battery performance is the capacity, or the capacity retention, of a battery constructed using a particular positive electrode, as a function of charge rate, commonly referred to as "C-rate." A variety of C-rates may be used to test performance, including a 1C rate, a 2C rate, a 5C rate, and a 10C rate, where the increasing number signifies a faster charge (or discharge) rate. For example, the 1C rate is a discharge rate at which the battery will be able to provide a current for one hour equal to its rated capacity, and 10C is a discharge rate at which the battery will be able to provide a current at 10 times its rated capacity for 6 minutes (i.e., one-tenth of an hour). For example, a 1,000 mAh-rated cell, at a 10 C rate, will discharge at 10,000 mA for 6 minutes. Accordingly, positive electrodes are considered to have enhanced performance when they retain relatively high amounts of capacity at a 10C rate (e.g., a high charge/discharge rate).

While any anode active material and electrolyte may be used to test battery performance, the battery cells disclosed herein used a graphite coated anode (e.g., surface modified graphite) and an electrolyte including lithium hexafluorophosphate ($LiPF_6$), and additives such as ethylene carbonate (EC), propylene carbonate (PC), ethyl methyl carbonate (EMC), diethyl carbonate (DC), propanesultone (PS), vinylene carbamate (VC), and lithium bis(oxalate)borate (LiBoB).

Figure 5:
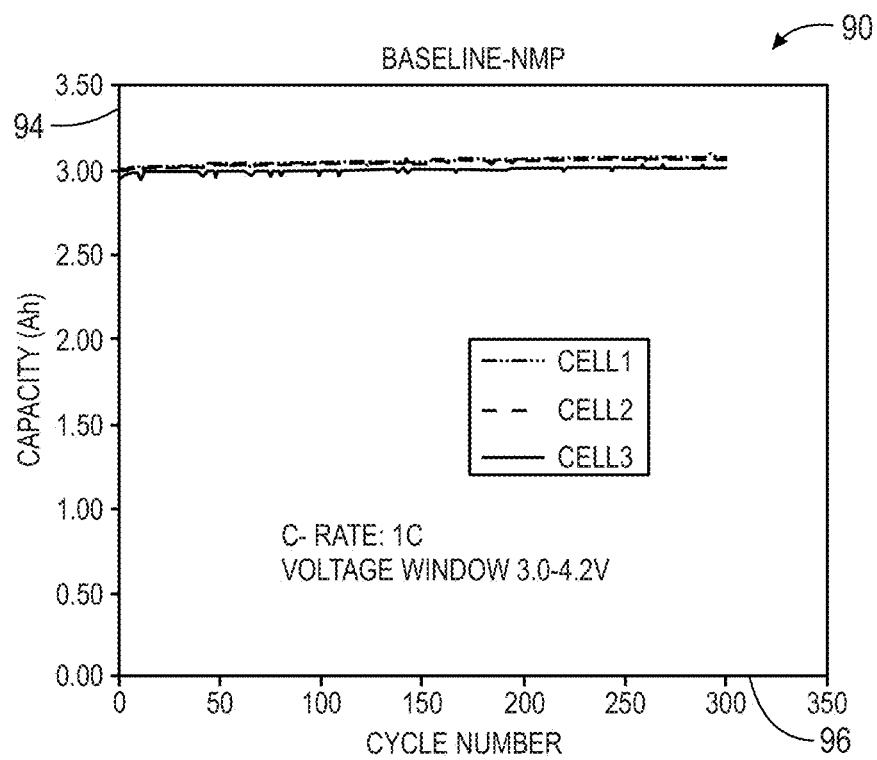
FIG. 5 is a plot of capacity as a function of charge/discharge rate cycles performed at a 1C rate for positive electrodes produced using an NMP electrode formulation, in accordance with an embodiment of the present disclosure.
Figure 6:
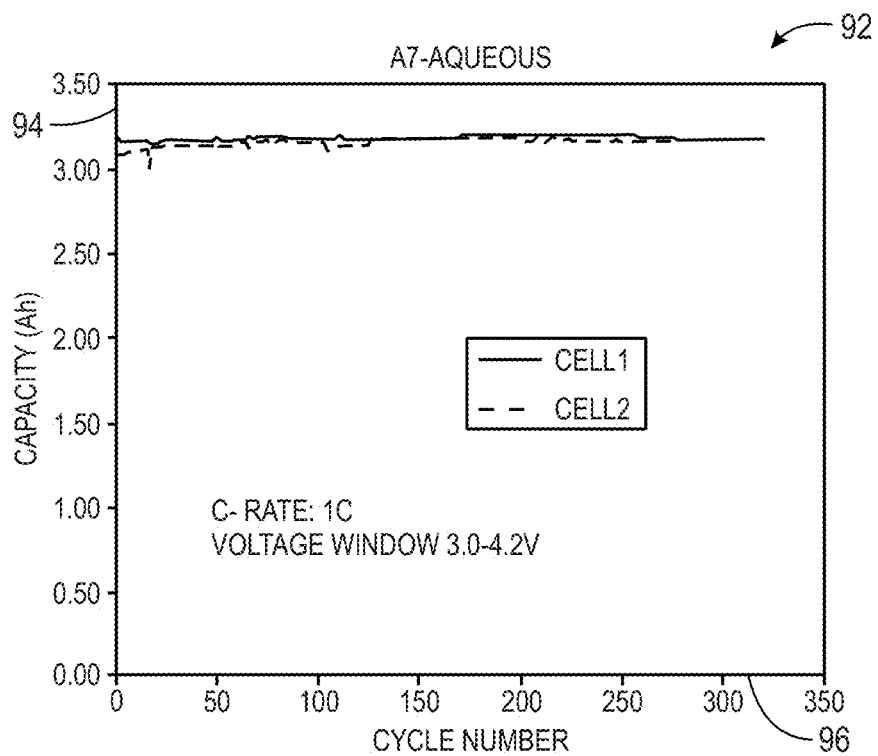
FIG. 6 is a plot of capacity as a function of charge/discharge rate cycles performed at a 1C rate for positive electrodes produced using an aqueous electrode formulation that includes acid, in accordance with an embodiment of the present disclosure.

The electrode formulation ranges set forth in Table 1 may be useful for generating a wide variety of coated positive electrodes (e.g., the positive electrode 20). However, as also noted above, it should be appreciated that changes in the formulation can drastically affect the performance of the positive electrode. Tables 2 and 3 below provide a series of example electrode formulations and cathode active material densities for the positive electrodes, respectively. FIGS. 5 and 6 are plots 90 and 92, respectively, providing experimental performance data (capacity 94) measured in amperehour (Ah) as a function of cycle number at 30° C. (cycles 96), where each cycle is performed at 1C rate and the voltage window for the electrodes is between approximately 3.0 to approximately 4.2 volts. Plots 90 and 92 correspond to experimental performance data for the baseline-NMP and the A7-Aqueous formulations, respectively, listed in Table 2. It is clear from plots 90 and 92 that, similar to the baseline-NMP formulation, the A7-Aqueous formulation maintains capacity after 300 cycles at a 1C rate. Therefore, positive electrodes coated with the water-only slurries prepared using the disclosed technique are comparable in performance to positive electrodes prepared using organic solvents (e.g., NMP).

TABLE 2

Example Electrode Formulations

| Formulation | % by weight of electrode formulation | | | |
|---|---|---|---|---|
| | NMC | CB | CMC | Binder* |
| Baseline-NMP | 92.0% | 4.0% | — | 4.0% |
| A1-Aqueous | 93.5% | 4.0% | 1.0% | 1.5% |
| A2-Aqueous | 93.7% | 4.0% | 1.0% | 1.3% |

TABLE 2-continued

Example Electrode Formulations

| Formulation | % by weight of electrode formulation | | | |
|---|---|---|---|---|
| | NMC | CB | CMC | Binder* |
| A3-Aqueous | 94.0% | 4.0% | 1.0% | 1.0% |
| A4-Aqueous | 93.8% | 4.0% | 0.7% | 1.5% |
| A5-Aqueous | 94.0% | 4.0% | 0.7% | 1.3% |
| A6-Aqueous | 94.3% | 4.0% | 0.7% | 1.0% |
| A7-Aqueous | 94.0% | 4.0% | 0.5% | 1.5% |
| A8-Aqueous | 94.2% | 4.0% | 0.5% | 1.3% |
| A9-Aqueous | 94.5% | 4.0% | 0.5% | 1.0% |

*Baseline formulation binder is polyvinylidene fluoride;
Aqueous formulation binder is SBR

TABLE 3

Example Electrode Surface Properties

| | A2-Aqueous | A7-Aqueous |
|---|---|---|
| Load Weight ($mg/cm^2$) | 12-16 | 4-8 |
| Density ($g/cm^3$) | 1-4 | 1-4 |

In addition to comparing performance between electrodes produced with aqueous and non-aqueous electrode formulations, it may also be desirable to evaluate performance between the different aqueous electrode formulations. Indeed, changes in the formulation can drastically affect the performance of the positive electrode.

Figure 7:
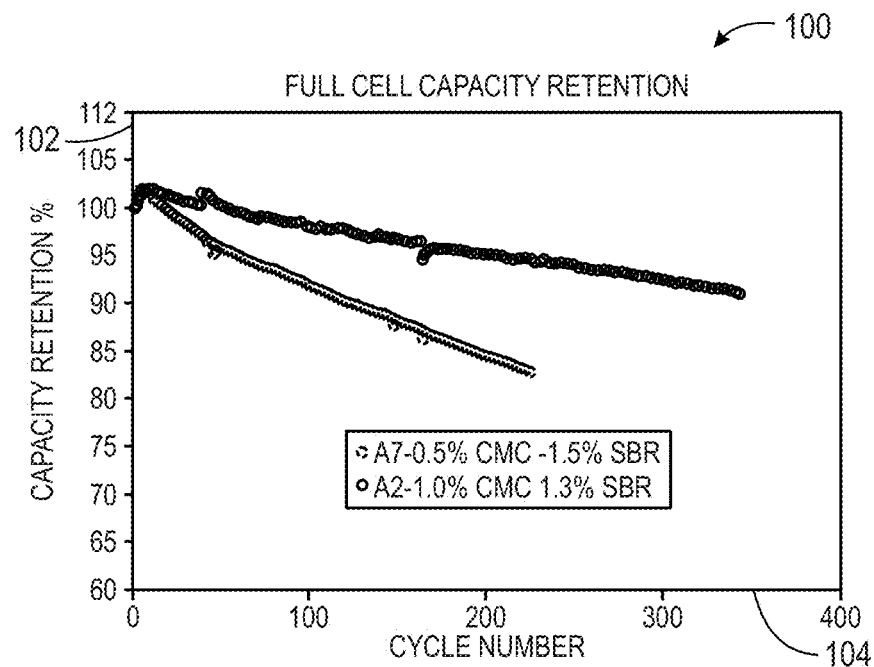
FIG. 7 is a plot of capacity retention percentage as a function of charge/discharge cycles performed at 5C rate at room temperature, for positive electrodes produced using an electrode formulation that includes acid, in accordance with an embodiment of the present disclosure.

FIG. 7 is a combined plot 100 providing experimental room temperature (e.g., approximately 30° C.) performance data (capacity retention percentage 102) as a function of cycle number 104 between the A2- and the A7-Aqueous formulations shown in Table 2, where each cycle is performed at a 5C rate. As shown in the plot 100, positive electrodes coated with the A2-Aqueous formulation have a markedly higher capacity retention percentage compared to the A7-Aqueous formulation. For example, as illustrated in plot 100, positive electrodes coated with the A2-Aqueous formulation retain approximately 90% of their discharge capacity after 300 cycles. In contrast, electrodes coated with the A7-Aqueous formulation retain less than approximately 85% of their discharge capacity after 200 cycles. This may be due to viscosity differences between the A2- and A7-Aqueous formulations. For example, the A2-Aqueous formulation has approximately 1.0% viscosity enhancer compared to 0.5% in A7-Aqueous formulation. As such, the cathode slurry formulation A2-Aqueous may have improved homogenous dispersive properties compared to the cathode slurry formulation A7-Aqueous. As shown in Table 3 above, the load weight of the electrode formulation on collectors coated with the A2-Aqueous slurry is approximately from 1 to approximately 2 times more than the load weight for collectors coated with the A7-Aqueous formulation. This may be attributed to the higher viscosity and homogeneity of the A2-Aqueous formulation compared to the A7-Aquous formulation. Therefore, the A2-Aqueous formulation may facilitate generation of smooth and uniform positive electrodes, resulting in good electrode performance. The differences in performance data between the A2- and A7-Aqueous formulations demonstrates the effects of changes in cathode slurry formulations on electrode performance.

Figure 8:
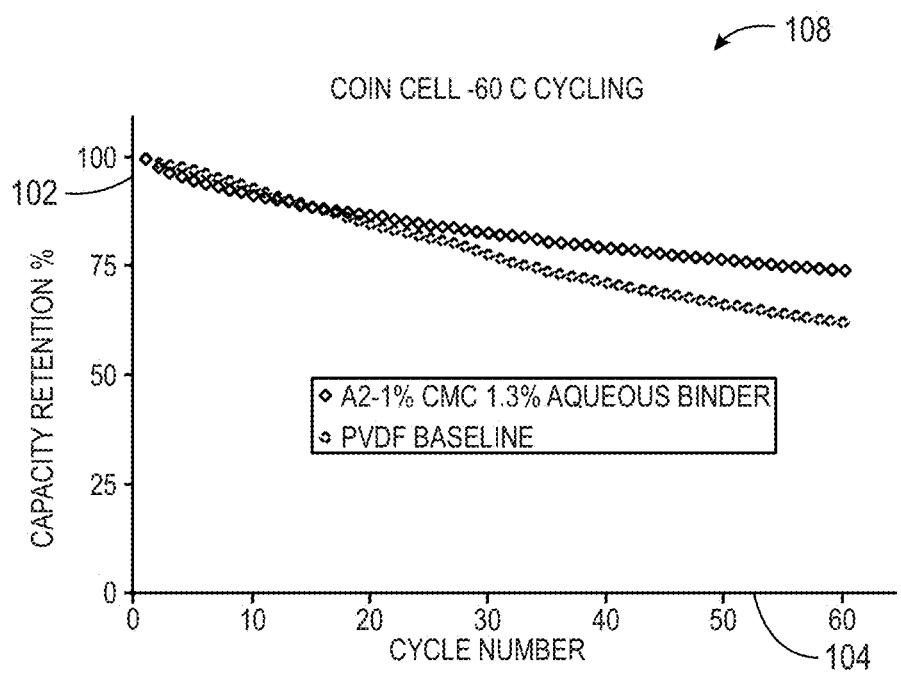
FIG. 8 is a plot of capacity retention percentage as a function of discharge cycles performed at 5C rate at 60° C., for positive electrodes produced using an electrode formulation that includes acid, in accordance with an embodiment of the present disclosure.

Similar to plot 100, FIG. 8 illustrates a combined plot 108 of capacity retention percentage 102 as a function of cycle number 104 between positive electrodes coated with the baseline-NMP and A2-Aqueous formulations. As is readily apparent from the plot 108, the positive electrodes coated with the A2-Aqueous formulation have decreased sensitivity to temperature compared to the baseline formulation. For example, electrodes coated with the A2-Aqueous formulation retain approximately 75% of their discharge capacity after 60 cycles compared to approximately 60% for the baseline-NMP formulation at approximately 60° C. As such, positive electrodes coated with the A2-Aqueous formulation exhibit a high degree of temperature tolerance, and thereby are suitable for use in high-temperature applications where there may be relatively long periods of use (e.g., in xEVs).

Referring now to FIGS. 9 and 10, plots 110 and 112, respectively, depict experimental performance data of a secondary lithium ion battery that incorporates a positive electrode produced using cathode slurry formulation A2-Aqueous, shown in Table 2, with and without addition of the pH modifier (e.g., oxalic acid). The plot 110 specifically includes voltage (V) 114 as a function of capacity in ampere-hour (Ah) 116 for a positive electrode formed using the pH modifier (e.g., oxalic acid) and a positive electrode formed using no pH modifier. As depicted in the plot 110 of FIG. 9, the C-rates are: 1C 118, 2C 120, and 3C 122. Accordingly, the data is expected to show a drop in voltage 114 as the C-rate increases, since the rate of discharge is increasing. The plot 112 of FIG. 10 depicts internal resistance in milliohms (me) 126 as a function of state of charge (SoC) percentage 128. As clearly shown in plots 110 and 112, the addition of the pH modifier to the cathode slurry formulation does not have any significant effect on the performance of the positive electrode. Indeed, positive cathodes formed with cathodes slurries having acid or no acid have similar performance.

One or more of the disclosed embodiments, alone or on combination, may provide one or more technical effects useful in the production of positive electrodes for ion batteries (e.g., secondary lithium ion batteries). For example, certain embodiments of the present approach may enable extended lifetimes of such batteries, including positive electrodes, negative electrodes, and electrolytes, among others. Indeed, the approaches described herein may improve the production of the battery cells 10 by enabling the electrodes of the battery cells 10 to be produced in a more environmentally-friendly manner and also by eliminating costly manufacturing steps, such as solvent recycling. The approaches described herein may also provide battery modules with improved capacity retention, even at high discharge rates, and decreased temperature sensitivity. By specific example, adjusting the pH of the cathode slurry used to produce the positive electrodes for the battery modules may enable formation of a homogenous water-only cathode slurry resulting in battery cells having superior performance compared to battery cells prepared using organic solvents, such as NMP. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of making a positive electrode, comprising:
forming a slurry of particles by mixing an electrode formulation, a water soluble polymer, a diluent, and oxalic acid, the mixing comprising:
mixing the diluent with the water soluble polymer to form a viscosity enhancer solution;
mixing only the oxalic acid with the viscosity enhancer solution to produce a pH-adjusted viscosity enhancer solution, an amount of the oxalic acid mixed with viscosity enhancer being between 0.1% by weight and 0.5% by weight, based on a weight of the slurry; and
mixing the pH-adjusted viscosity enhancer solution comprising the mixed diluent, the water soluble polymer and the oxalic acid with the electrode formulation;
the electrode formulation comprising an electrode active material, a conductive carbon source, and an organic polymeric binder, the diluent consisting essentially of water and mixing the pH-adjusted viscosity enhancer solution with the electrode formulation comprising first mixing the pH-adjusted viscosity enhancer solution with the electrode active material and the conductive carbon source, and then mixing the resulting mixture with a solution of the organic polymeric binder in water;
coating the slurry on a collector; and
drying the coating on the collector to form the positive electrode.

2. The method of claim 1, wherein drying the coating consists of drying at a temperature of between approximately 35° C. and approximately 65° C. to maintain positive electrode performance.

3. The method of claim 2, wherein the oxalic acid is configured to release carbon dioxide as a by-product during the drying, and wherein the drying last less than approximately 3 minutes.

4. The method of claim 1, wherein the electrode formulation consists essentially of the electrode active material, the conductive carbon source, the organic polymeric binder, and the water soluble polymer, and wherein,
the conductive carbon source is present in an amount of 4% by weight or less, based on the total weight of the electrode formulation;
the organic polymer binder is present in an amount between 1.0% by weight and 1.5% by weight, based on the total weight of the electrode formulation;

the water soluble polymer is present in an amount between 0.7% by weight and 1.25% by weight, based on the total weight of the electrode formulation; and the at least one electrode active material is present in an amount between 93.5% by weight and 94.5% by weight, based on the total weight of the electrode formulation.

5. The method of claim 1, wherein the conductive carbon source is carbon black, the organic polymer binder is a monovinylarene-conjugated diene copolymer, and the water soluble polymer is a cellulose derivative.

6. The method of claim 1, wherein the solid content of the slurry is approximately 60% by weight or more, based on the total weight of the slurry.

7. The method of claim 1, wherein including the oxalic acid adjusts a pH of the slurry to below 9.

* * * * *